United States Patent
Nguyen

(10) Patent No.: US 7,208,927 B1
(45) Date of Patent: Apr. 24, 2007

(54) SOFT START SYSTEM AND METHOD FOR SWITCHING REGULATOR

(75) Inventor: James H. Nguyen, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 3 days.

(21) Appl. No.: 11/299,171

(22) Filed: Dec. 9, 2005

(51) Int. Cl.
  *G05F 1/40* (2006.01)
(52) U.S. Cl. .................................. 323/282; 323/901
(58) Field of Classification Search ............... 323/280, 323/282, 283, 284, 351, 901
  See application file for complete search history.

(56) References Cited

U.S. PATENT DOCUMENTS

| 4,806,842 | A  |   | 2/1989  | Bittner |
| 6,831,449 | B2 | * | 12/2004 | Nishida et al. ............. 323/284 |
| 7,045,992 | B1 | * | 5/2006  | Silva et al. ................. 323/222 |
| 7,064,531 | B1 | * | 6/2006  | Zinn ........................... 323/268 |
| 7,129,679 | B2 | * | 10/2006 | Inaba et al. ................. 323/222 |
| 2006/0227478 | A1 | * | 10/2006 | Herr et al. .................. 361/93.1 |

* cited by examiner

*Primary Examiner*—Adolf Berhane
(74) *Attorney, Agent, or Firm*—Perkins Coie LLP; Zhou Lu

(57) ABSTRACT

The present invention introduces methods and circuits to provide a soft start for a switching regulator. A feedback voltage from output terminal is monitored and used to regulate the bias current of the regulator's error amplifier. The present invention also enables a smooth transition from the soft start to normal operation.

6 Claims, 3 Drawing Sheets

US 7,208,927 B1

SOFT START SYSTEM AND METHOD FOR SWITCHING REGULATOR

TECHNICAL FIELD

The present invention relates generally to switching regulators, and more particularly, to methods and schemes for switching regulators during start-up.

BACKGROUND

In a conventional switching regulator, such as a 6-pin package boost converter shown in FIG. 1, an error amplifier U1 rapidly charges the compensation capacitor C1 during the startup. Hence, the circuit charges the output capacitor Cout with its maximum duty cycle. This may cause a surge that overloads the input supply or cause over-voltage at the output. The surge can be avoided by using a soft-start controller to slowly ramp up the voltage at C1 and limit the energy being transferred to Cout.

FIG. 2 shows a prior art soft-start method. During the power-off period, capacitors C1 and C2 are discharged to ground GND. When the regulator starts up, C2 is slowly charged by a small current from a transistor MP3. The output of the error amplifier U1 is clamped by a transistor Q1 whose base terminal is coupled to C2 and a PIN SS. Q1 regulates U1's output voltage to rise at the same rate as the voltages at C2 and SS. This method allows the circuit to slowly start up the output voltage with a minimum duty cycle and avoids the over-voltage surge problem. However, it requires an extra capacitor and an extra pin which could be a problem if the number of pins is limited and/or the capacitor is too large to be integrated into a single integrated circuit package.

FIG. 3 shows another prior art soft-start method, which does not require the SS pin and capacitor C2 of the circuit of FIG. 2. During the power off period, a capacitor C1 is discharged to ground through a transistor MN3. When the system starts up, the output terminal of the error amplifier ERROR AMP U1 is disconnected from the compensation network comprising a resistor R1 and a compensation capacitor C1. The pin COMP is connected to a small pull-up current source through a transistor MP4, which slowly charges the compensation capacitor C1 so that the voltage at COMP rises slowly to limit the energy being delivered to the output. When the voltage at the pin FB equals to a reference voltage at a comparator U3, the output of U3 sets the flip-flop RSFF U4 so that COMP is disconnected from the pull up current through MP4 while ERROR AMP U1 is connected to COMP through activated transistors, MN5 and MP5, for a normal operation. A disadvantage with this method is that the output of ERROR AMP U1 is at the high rail while it remains disconnected from COMP during the start-up. When the output of ERROR AMP U1 is connected to COMP at the end of soft start cycle, it may cause the voltage at COMP to jump much higher and results in a possible voltage overshot at the output.

BRIEF DESCRIPTION OF THE DRAWINGS

The following figures illustrate embodiments of the invention. These figures and embodiments provide examples of the invention and they are non-limiting and non-exhaustive.

DETAILED DESCRIPTION

Embodiments of a system and method that uses a soft-start switching regulator and accompanying circuits to achieve a smooth transition from soft start to normal operation are described in detail herein. In the following description, some specific details, such as example circuits and example values for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with systems, circuits, and methods that are meant to be exemplary and illustrative. In various embodiments, the above problem has been reduced or eliminated, while other embodiments are directed to other improvements.

The present invention relates to circuits and methods for soft-start switching regulators. Circuits in accordance with the present claimed invention for switching regulators can monitor a feedback voltage of the switching regulator's output terminal and regulate the bias current of the error amplifier to achieve a soft start and a smooth transition from the soft start to normal operation.

Figure 1:
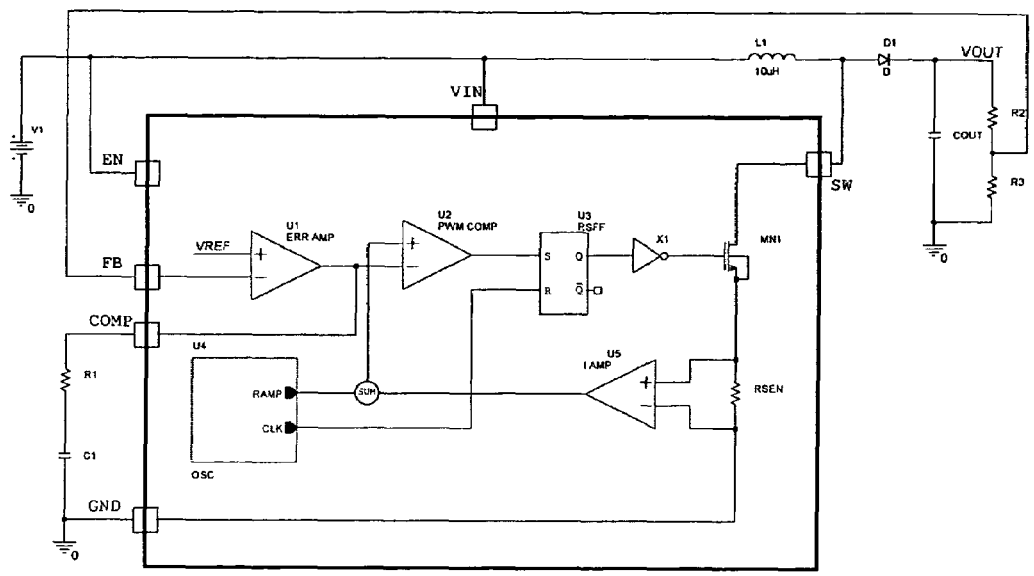
FIG. 1 shows a prior art schematic diagram of a 6-pin package boost converter.
Figure 2:
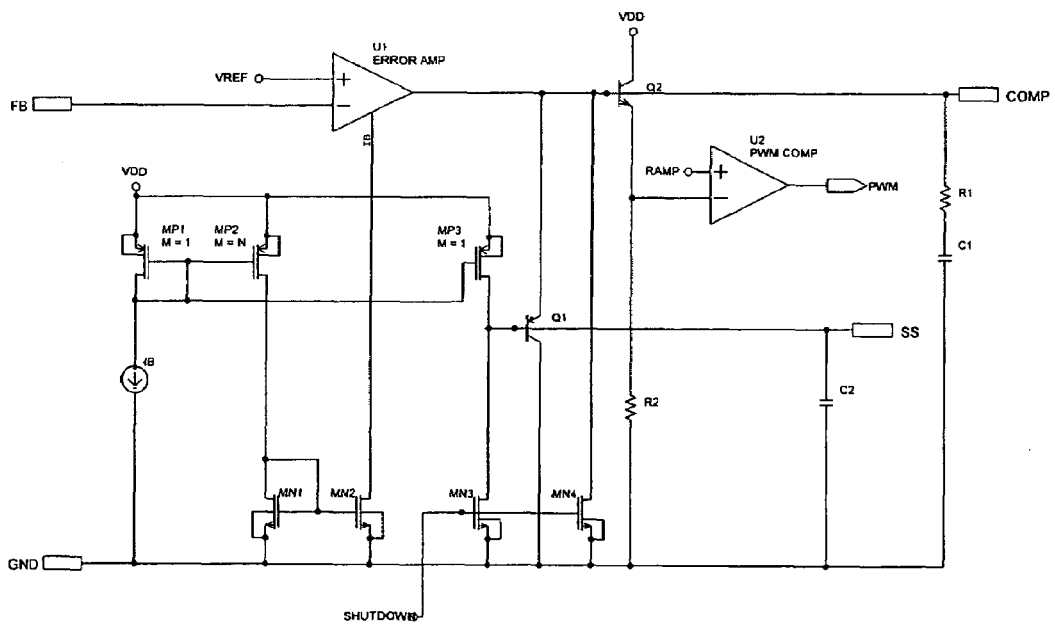
FIG. 2 shows a prior art schematic diagram of a soft-start switching regulator.
Figure 3:
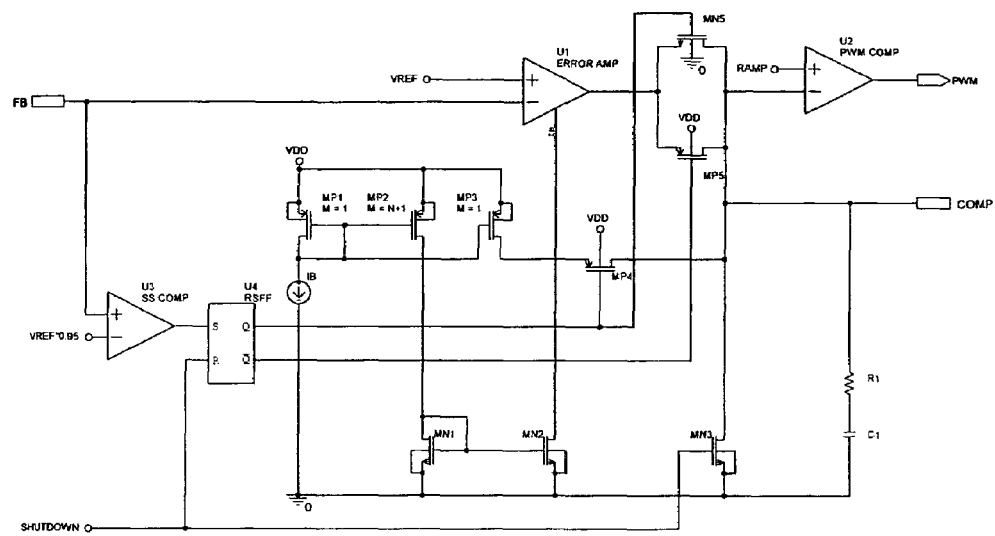
FIG. 3 shows a prior art schematic diagram of another soft-start switching regulator.
Figure 4:
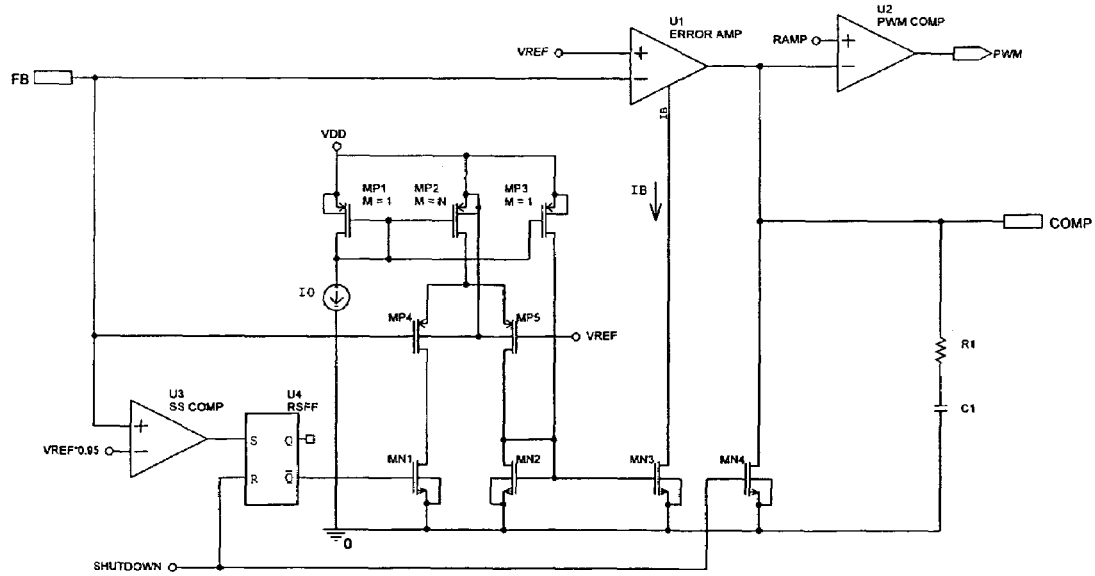
FIG. 4 shows a schematic diagram of a soft-start switching regulator in accordance with an embodiment of the present invention.

FIG. 4 illustrates one embodiment of the present invention in a switching regulator. A feedback circuit being coupled to the output terminal provides a feedback voltage to a feedback pin FB. FB is coupled to the negative terminal of an error amplifier ERROR AMP whose positive terminal is coupled to a reference voltage $V_{REF}$. The output terminal of ERROR AMP is coupled to a compensation pin COMP and a compensation capacitor C1 through a resistor R1. FB is also coupled to the positive terminal of a comparator SS COMP whose negative terminal is coupled to an operational amplifier U3, which also has its negative terminal connected to reference voltage $V_{REF}*0.95$. The output terminal of U3 SS COMP is coupled to a flip-flop RSFF that has set, reset, and output terminals.

RSFF is reset by a SHUTDOWN signal that is responsive to a condition when the regulator is either disabled or over-temperature or under-voltage or over-voltage. When SHUTDOWN is high, it resets RSFF and turns on a transistor MN4 to discharge C1 to ground. MN4's drain terminal is coupled to COMP and its source terminal is coupled to ground.

One embodiment of this invention is to reduce the bias current of ERROR AMP $I_B$ during start-up. In FIG. 4, $I_B$ is monitored and controlled by a set of current mirrors, which includes MP1, MP2, MP3, MP4, MP5, MN1, MN2, and MN3 transistors. Assume that the current through the drain terminal of MP1 is $I_0$. The currents through the drain terminals of MP3 and MP2 are $I_0$ and $N*I_0$, respectively. Both MP4 and MP5 have their source terminals being coupled to the drain terminal of MP2. MP4's gate terminal is coupled to FB, and its drain terminal is coupled to the drain terminal of MN1. MN1's gate terminal is coupled to an output terminal of RSFF and its source terminal is grounded. MP5's gate terminal is coupled to $V_{REF}$ and its drain terminal is coupled to the gate/drain terminal of MN2. MN2's source terminal is grounded and its drain terminal is coupled to its gate terminal, MP3 and MP5's drain terminals, and MN3's gate terminal. MN3's source terminal is grounded and its drain terminal is coupled to ERROR AMP to provide its bias current.

Since MN3 and MN2 form a current mirror, the drain current of MN3 equals to the sum of drain currents of MP5 and MP3. When SHUTDOWN is low and the voltage at FB is less than $0.95*V_{REF}$, MP4 takes almost all the current from MP2. $I_B$ is equal to the current through MP3, $I_O$. Thus, ERROR AMP slowly charges the compensation capacitor C1. The slow slew rate of COMP forces the regulator to operate at a low duty cycle. As the voltage at FB approaches $V_{REF}$, MP2's current starts to be shared by MP4 and MP5. When the voltage at FB is higher than $0.95*V_{REF}$, the output of SS COMP sets RSFF, which turns off MN1. All MP2's current starts to flow through MP5. Both $I_B$ and MN3's drain current become $(N+1)*I_O$, which is a regular bias current under normal operation. The present invention prevents the voltage at COMP from jumping higher and a possible output voltage overshot at the end of soft start. Also, it does not require an extra pin and extra large capacitor.

Figure 5:
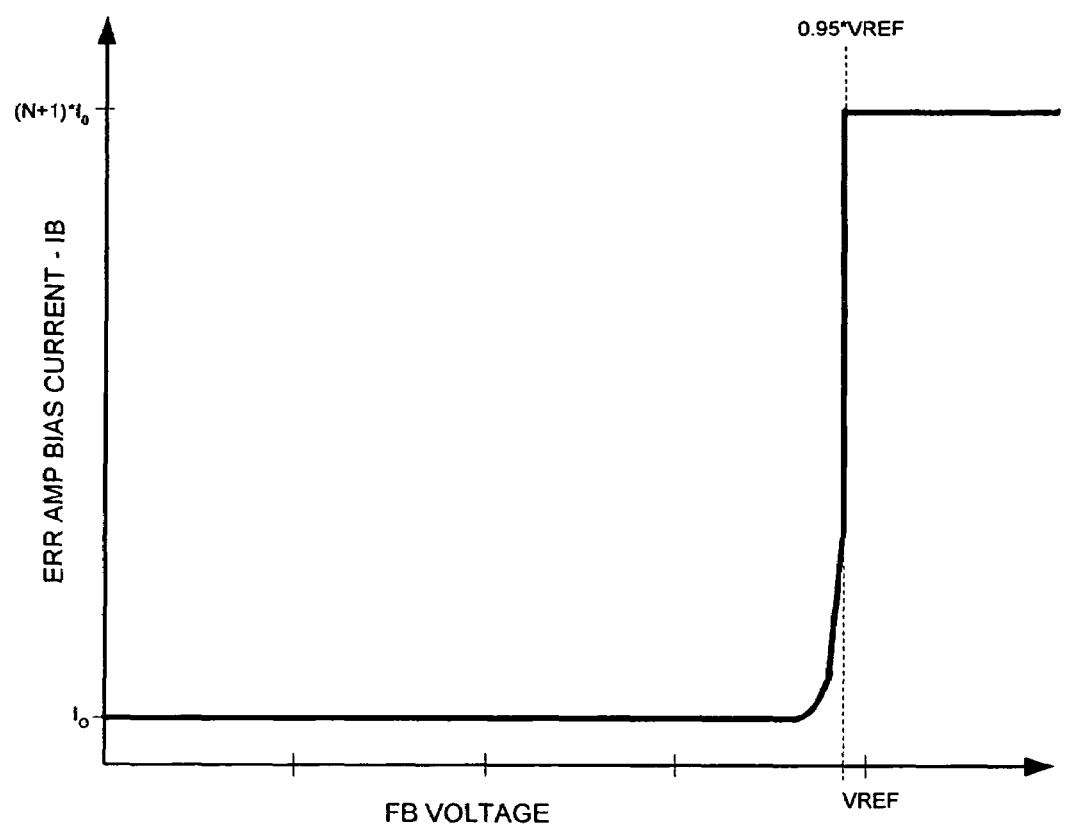
FIG. 5 shows the relationship between the error amplifier's bias current and the voltage at FB during start up period in the soft-start switching regulator of FIG. 4.

FIG. 5 shows the relationship between the error amplifier's bias current and the voltage at FB during start up period in the soft-start switching regulator of FIG. 4. The bias current equals to $I_O$ when the voltage at FB is less than and not near $0.95*V_{REF}$ and it equals to $(N+1)*I_O$ when the voltage at FB is larger than $0.95*V_{REF}$.

In present invention, the soft start of a switching regulator is achieved by monitoring a feedback voltage from the output terminal and regulating the error amplifier's bias current. The bias current is provided by a transistor that is coupled to a set of current mirrors, which are regulated by the feedback voltage and an output signal of a flip-flop. When the feedback voltage is less than a reference voltage, a small bias current forces the regulator operates at a low duty cycle and slowly charges the compensation capacitor. When the feedback voltage is larger than the reference voltage, the switching regulator resumes normal operation. Since the error amplifier always operates under closed loop condition, the invention provides a smooth transition from soft start to normal operation.

The description of the invention and its applications as set forth herein is illustrative and is not intended to limit the scope of the invention. Variations and modifications of the embodiments disclosed herein are possible, and practical alternatives to and equivalents of the various elements of the embodiments are known to those of ordinary skill in the art. Other variations and modifications of the embodiments disclosed herein may be made without departing from the scope and spirit of the invention.

I claim:

1. A method for soft-starting a switching regulator that includes an error amplifier, a compensation capacitor, a flip-flop, a comparator, and a bias current regulating circuit; comprising:

monitoring a feedback voltage from the output terminal of said switching regulator;

providing a shutdown signal when said switching regulator is either disabled, under or over-temperature, under-voltage, or over-voltage to reset said flip-flop that has set, reset, and output terminals;

discharging said compensation capacitor responsive to said shutdown signal;

comparing said feedback voltage with a first reference voltage through said comparator and if said feedback voltage becomes larger than said first reference voltage, the output signal of said comparator sets said flip-flop; and regulating the bias current of said error amplifier through said bias current regulating circuit responsive to said feedback voltage and the output signal of said flip-flop by:

(1) if said feedback voltage is less than said first reference voltage, the bias current of said error amplifier is regulated to a small value to ensure a soft start for said switching regulator;

(2) if said feedback voltage is larger than said first reference voltage, the bias current of said error amplifier has its normal value under normal operation;

wherein said error amplifier operates under close-loop condition when its bias current switches from said small value to its normal value.

2. The switching regulator of claim 1, wherein said first reference voltage is less than a second reference voltage for said error amplifier so that said comparator switches before said feedback voltage increases to the value of said second reference voltage.

3. The switching regulator of claim 2, wherein said bias current regulating circuit comprises:

a first current mirror providing a first current $I_O$;

a second current mirror being coupled to said first current mirror and providing a second current $N*I_O$;

a third current mirror being coupled to both said first and second current mirror and providing a third current $I_O$;

a first transistor pair consisting of a first and a second transistors with their source terminals being coupled to the drain terminal of said second current mirror, wherein the gate terminal of said first transistor is coupled to said feedback voltage and the gate terminal of said second transistor is coupled to said second reference voltage;

a second transistor pair consisting of a third and a fourth transistors wherein said third transistor's gate, drain, and source terminals are coupled to the output terminal of said flip-flop, the source terminal of said first transistor, and ground, respectively; said fourth transistor's source terminal is coupled to ground and its gate terminal is coupled to its drain terminal, the gate terminal of a power transistor, and the drain terminals of said second transistor and said third current mirror; and said power transistor having the same amount of drain current as that of said fourth transistor and providing the bias current for said error amplifier.

4. A soft-start switching regulator, comprising:

a shutdown circuit for providing a shutdown signal when said switching regulator is disabled, under- or over-temperature, under-voltage, or over-voltage;

a feedback circuit being coupled to the output terminal of said switching regulator and providing a feedback voltage;

a compensation capacitor;

a comparator being coupled to said feedback voltage and a first reference voltage;

an error amplifier being coupled to said feedback voltage and a second reference voltage, and providing a charging current to said compensation capacitor;

a flip-flop having set, reset, and output terminals wherein said flip-flop is set by the output signal of said comparator, and reset by said shutdown signal; and a bias current regulating circuit responsive to said feedback voltage and the output signal of said flip-flop to regulate the bias current of said error amplifier;

wherein if said feedback voltage is less than said first reference voltage, the bias current of said error amplifier is regulated to a small value to ensure a soft start for said switching regulator;

wherein if said feedback voltage is larger than said first reference voltage, the bias current of said error amplifier has its normal value under normal operation; and wherein said error amplifier operates under close-loop condition when its bias current switches from said small value to its normal value.

5. The switching regulator of claim 4, wherein said first reference voltage is less than a second reference voltage for said error amplifier so that said comparator switches before said feedback voltage increases to the value of said second reference voltage.

6. The switching regulator of claim 5, wherein said bias current regulating circuit comprises:

a first current mirror providing a first current $I_0$;

a second current mirror being coupled to said first current mirror and providing a second current $N*I_0$;

a third current mirror being coupled to both said first and second current mirror and providing a third current $I_0$;

a first transistor pair consisting of a first and a second transistors with their source terminals being coupled to the drain terminal of said second current mirror, wherein the gate terminal of said first transistor is coupled to said feedback voltage and the gate terminal of said second transistor is coupled to said second reference voltage;

a second transistor pair consisting of a third and a fourth transistors wherein said third transistor's gate, drain, and source terminals are coupled to the output terminal of said flip-flop, the source terminal of said first transistor, and ground, respectively; said fourth transistor's source terminal is coupled to ground and its gate terminal is coupled to its drain terminal, the gate terminal of a power transistor, and the drain terminals of said second transistor and said third current mirror; and said power transistor having the same amount of drain current as that of said fourth transistor and providing the bias current for said error amplifier.

* * * * *